(12) United States Patent
Yano et al.

(10) Patent No.: US 8,498,095 B2
(45) Date of Patent: Jul. 30, 2013

(54) THIN-FILM CAPACITOR WITH INTERNALLY HOLLOW THROUGH HOLES

(75) Inventors: Yoshihiko Yano, Tokyo (JP); Yasunobu Oikawa, Tokyo (JP); Kenji Horino, Tokyo (JP); Hitoshi Saita, Tokyo (JP)

(73) Assignee: TDK Corporation, Tokyo (JP)

( * ) Notice: Subject to any disclaimer, the term of this patent is extended or adjusted under 35 U.S.C. 154(b) by 268 days.

(21) Appl. No.: 12/956,060

(22) Filed: Nov. 30, 2010

(65) Prior Publication Data

US 2011/0128669 A1    Jun. 2, 2011

(30) Foreign Application Priority Data

Nov. 30, 2009  (JP) ................ P2009-271987

(51) Int. Cl.
  *H01G 4/005*  (2006.01)
  *H01G 4/20*  (2006.01)
  *H01G 4/33*  (2006.01)
  *H01G 4/012*  (2006.01)

(52) U.S. Cl.
  CPC .............. *H01G 4/33* (2013.01); *H01G 4/005* (2013.01); *H01G 4/012* (2013.01)
  USPC .......................... 361/303; 361/312

(58) Field of Classification Search
  CPC  H01G 4/012; H01G 4/30; H01G 4/232; H01G 4/005; H01G 4/008; H01G 4/33
  USPC .............. 361/312, 306.3, 321.2, 303
  See application file for complete search history.

(56) References Cited

U.S. PATENT DOCUMENTS

| | | | |
|---|---|---|---|
| 5,774,326 A * | 6/1998 | McConnelee et al. | 361/313 |
| 6,407,907 B1 * | 6/2002 | Ahiko et al. | 361/306.3 |
| 6,462,933 B2 | 10/2002 | Takeshima et al. | |
| 6,724,611 B1 * | 4/2004 | Mosley | 361/306.3 |
| 6,979,486 B2 * | 12/2005 | Nakamura | 428/188 |
| 7,161,793 B2 * | 1/2007 | Kurihara et al. | 361/306.3 |
| 7,561,406 B2 | 7/2009 | Saita et al. | |

(Continued)

FOREIGN PATENT DOCUMENTS

| JP | A-56-144523 | 11/1981 |
|---|---|---|
| JP | 05090062 A * | 4/1993 |

(Continued)

OTHER PUBLICATIONS

Yoneda et al.; "Preparation and Characterization of Ultra Thin Chip Capacitor," *CARTS Europe 2006 Proceedings*; Sep. 25-28, 2006; pp. 273-280.

*Primary Examiner* — David M Sinclair
(74) *Attorney, Agent, or Firm* — Oliff & Berridge, PLC (57) ABSTRACT

A thin-film capacitor that is less prone to generation of internal cracking or peeling is provided. In a thin-film capacitor according to the present embodiment, because through holes H are formed in internal electrodes containing Ni as a principal component in a lamination direction, a surface area of at least some of the through holes H is in the range of 0.19 $\mu m^2$ to 7.0 $\mu m^2$, and a ratio of a surface area of the through holes H to a surface area of an entire main surface of the internal electrodes is in the range of 0.05% to 5%, peeling or cracking is suppressed from occurring at the boundaries between the internal electrodes and dielectric layers, and as a result, the yield is enhanced.

2 Claims, 6 Drawing Sheets

U.S. PATENT DOCUMENTS

| | | |
|---|---|---|
| 2005/0194575 A1* | 9/2005 | Satou .......................... 252/500 |
| 2006/0000542 A1 | 1/2006 | Min et al. |
| 2007/0128758 A1* | 6/2007 | Tanaka et al. .................. 438/50 |
| 2008/0010798 A1 | 1/2008 | Borland et al. |
| 2008/0225463 A1* | 9/2008 | Takashima et al. ........ 361/306.3 |
| 2009/0279227 A1 | 11/2009 | Ha |
| 2011/0075317 A1* | 3/2011 | Oikawa et al. ................ 361/303 |

FOREIGN PATENT DOCUMENTS

| | | |
|---|---|---|
| JP | A-8-78283 | 3/1996 |
| JP | A-9-213569 | 8/1997 |
| JP | A-11-26290 | 1/1999 |
| JP | A-2001-217142 | 8/2001 |
| JP | 2001313230 A * | 11/2001 |
| JP | A-2005-85823 | 3/2005 |
| JP | A-2007-207948 | 8/2007 |
| JP | A-2007-294937 | 11/2007 |
| JP | A-2008-504690 | 2/2008 |
| JP | A-2008-109082 | 5/2008 |
| JP | A-2009-512177 | 3/2009 |
| JP | A-2009-267376 | 11/2009 |

* cited by examiner

THIN-FILM CAPACITOR WITH INTERNALLY HOLLOW THROUGH HOLES

BACKGROUND OF THE INVENTION

1. Field of the Invention

The present invention relates to a thin-film capacitor.

2. Related Background Art

With downsizing of electronic devices, there is an increasing demand for smaller and high-functionality electronic parts for use in the electronic devices. To meet such a demand, some of the available thin-film laminated capacitors have a very thin dielectric layer or an internal electrode layer, which is laminated on a base substrate by a thin-film technology, of a thickness of the order of a few hundred nanometers or below, and various configurations and manufacturing methods of such capacitors are being studied (for example, see Japanese Patent Application Laid-open No. S56-144523 and Japanese Patent Application Laid-open No. H11-26290). Recently, multi-layered thin-film capacitors having a considerably small cubic volume with a high electrostatic capacitance and a high withstanding voltage have been proposed, see for example, Published Japanese Translation of a PCT International Publication for Patent Application No. 2009-512177.

SUMMARY OF THE INVENTION

However, because the internal dielectric layer or the internal electrode layer of the multi-layered thin-film capacitors are prone to internal cracking and/or peeling, it is difficult to obtain sufficient yield from the multi-layered thin-film capacitors.

The present invention has been made in view of the above discussion and it is an object of the present invention to provide a thin-film capacitor that is less prone to internal cracking and/or peeling.

A study made by the inventor showed that the form of a surface of the internal electrode layer plays an important role in the generation of internal cracks in the multi-layered thin-film capacitors.

That is, a thin-film capacitor according to an aspect of the present invention includes a base electrode; two or more dielectric layers laminated on the base electrode; and an electrode containing Ni as a principal component and laminated between the dielectric layers, wherein the electrode has through holes that run in a lamination direction, a surface area of at least some of the through holes is in the range of 0.19 $\mu m^2$ to 7.0 $\mu m^2$, and a ratio of the surface area of the through holes to a surface area of an entire main surface of the electrode in which the through holes are formed is in the range of 0.05% to 5%.

As in the above thin-film capacitor, when there are through holes in the lamination direction in the electrode containing Ni as the principal component and laminated between the dielectric layers, the surface area of at least some of the through holes is within the above range, and the ratio of the surface area of the through holes to the surface area of the entire main surface of the electrode is within the above range, peeling or cracking is suppressed from occurring at the boundaries between the electrode and the dielectric layers, and as a result, the yield is enhanced.

It is preferable that the surface area of all the through holes is in the range of 0.19 $\mu m^2$ to 7.0 $\mu m^2$. When the surface area of all the through holes is within the above range, internal peeling or cracking is suppressed from occurring in the thin-film capacitor.

It is preferable that the through holes are internally hollow. When the through holes are internally hollow, peeling or cracking is further suppressed from occurring, and the yield can be further enhanced.

According to the present invention, a thin-film capacitor is provided that is less prone to internal cracking or peeling.

DESCRIPTION OF THE PREFERRED EMBODIMENTS

Exemplary embodiments of the present invention are explained below while referring to the accompanying drawings. Similar structural elements in the drawings are provided with similar reference numerals and overlapping explanation thereof is omitted.

Figure 1:
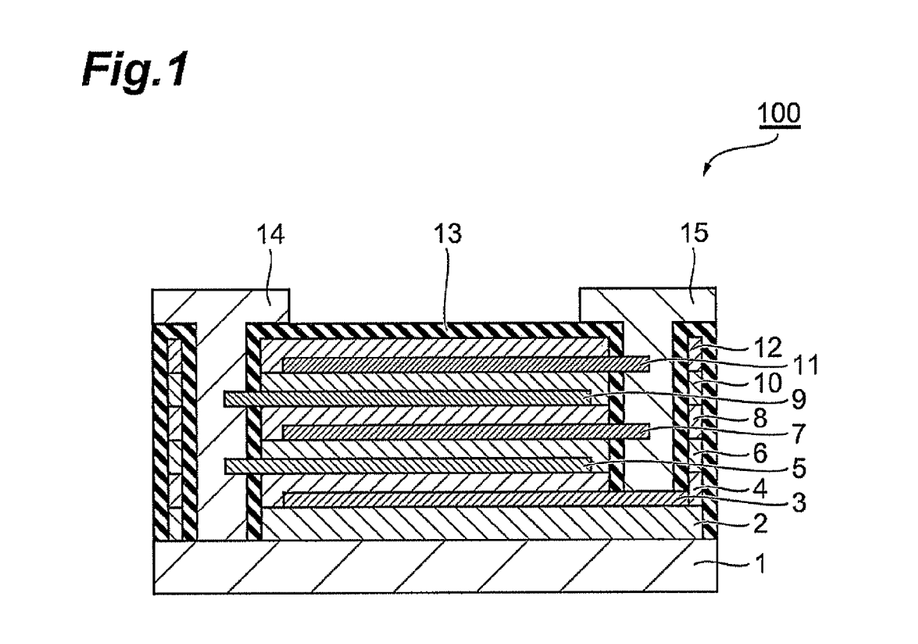
FIG. 1 is a schematic cross-section of a thin-film capacitor according to an embodiment of the present invention.

A thin-film capacitor 100 according to an embodiment is explained first. The thin-film capacitor 100 according to the embodiment includes, as shown in FIG. 1, a base electrode 1, five dielectric layers 2, 4, 6, 8, and 10 laminated on the base electrode 1, an internal electrode 3 laminated between the dielectric layers 2 and 4, an internal electrode 5 laminated between the dielectric layers 4 and 6, an internal electrode 7 laminated between the dielectric layers 6 and 8, an internal electrode 9 laminated between the dielectric layers 8 and 10, and an upper electrode 11 arranged on the opposite side of the base electrode 1 with the dielectric layers 2, 4, 6, 8, and 10 and the internal electrodes 3, 5, 7, and 9 sandwiched therebetween. Meanwhile, in the following explanation, a direction in which the dielectric layers and the internal electrodes are sequentially laminated in the order of the base electrode 1, the dielectric layer 2, the internal electrode 3, the dielectric layer 4, and so on, from the base electrode 1 toward the upper electrode 11 is referred to as a lamination direction.

The thin-film capacitor 100 further includes a pair of terminal electrodes 14 and 15. These terminal electrodes 14 and 15 are arranged on the opposite side of the base electrode 1 and they sandwich therebetween the dielectric layers 2, 4, 6, 8, and 10 and the internal electrodes 3, 5, 7, and 9. Out of the terminal electrodes 14 and 15, the terminal electrode 14 is electrically connected to the base electrode 1 and the internal electrodes 5 and 9. The other terminal electrode 15 is electrically connected to the dielectric layers 2, 6, and 10. The terminal electrodes 14 and 15 are insulated from each other. The thin-film capacitor 100 further includes a cover layer 12 that fills a space between a laminated member and the terminal electrodes 14 and 15. The base electrode 1, the dielectric layers 2, 4, 6, 8, and 10, the internal electrodes 3, 5, 7, and 9, and the upper electrode 11 constitutes the laminated member. The thin-film capacitor 100 further includes an insulating protective layer 13 that covers a portion between the terminal electrodes 14 and 15 and the cover layer 12. The various parts of the thin-film capacitor 100 are explained below.

The base electrode 1 is made from an electrically conducting material. Concretely, it is preferable that the electrically conducting material that constitutes the base electrode 1 includes an alloy containing nickel (Ni) or platinum (Pt) as a principal component, and specifically includes an alloy containing Ni as the principal component. It is preferable that a purity of Ni that constitutes the base electrode 1 be high, and it is preferable that the purity of Ni be higher than 99.99 weight %. The base electrode 1 may contain a minute amount of impurities. As the impurities contained in the base electrode 1 that is made of the alloy containing Ni as the principal component, transition metal elements such as iron (Fe), titanium (Ti), copper (Cu), aluminium (Al), magnesium (Mg), manganese (Mn), silica (Si) or chromium (Cr), vanadium (V), zinc (Zn), niobium (Nb), tantalum (Ta), yttrium (Y), lanthanum (La), and cesium (Ce), or rare-earth elements, or chlorine (Cl), sulfur (S), phosphorus (P), etc., can be considered. When these impurities diffuse from the base electrode 1 to a dielectric film during firing in a manufacturing method of the thin-film capacitor, which is explained later, these impurities may cause an undesired departure in a composition of a dielectric layer formed on a base electrode and/or an undesired variation in a microscopic structure of the dielectric layer by hampering crystallization of the dielectric layer and development of crystal particles leading to a degradation in an insulating resistance of the dielectric layer. The departure in the composition of the dielectric layer and/or the variation in the microscopic structure of the dielectric layer can hinder an increase in an electrostatic capacitance of the thin-film capacitor 100.

It is preferable that a thickness of the base electrode 1 be in a range of 5 micrometers ($\mu$m) to 100 $\mu$m, it is more preferable that the thickness be in a range of 20 $\mu$m to 70 $\mu$m, and it is still more preferable that the thickness be 30 $\mu$m. If the base electrode 1 is too thin, it may make handling of the base electrode 1 difficult in the process of manufacturing the thin-film capacitor 100 and if the base electrode 1 is too thick, it may dilute an effect of suppressing a leak current. Meanwhile, a surface area of the base electrode 1 is, for example, about 1×0.5 mm². It is preferable that the base electrode 1 be made from a metal foil and that the base electrode 1 functions as both a substrate and an electrode. Although it is ideal that the base electrode 1 according to the present embodiment also functions as the substrate, it is allowable to employ a substrate-electrode film structure consisting of a substrate made from Si or aluminium and an electrode made from a metal foil.

The dielectric layers 2, 4, 6, 8, and 10 are made from a (ferro) dielectric material having a perovskite structure such as $BaTiO_3$ (barium titanate), $(Ba_{1-x}Sr_x)TiO_3$ (barium strontium titanate), $(Ba_{1-x}Ca_x)TiO_3$, $PbTiO_3$, and $Pb(Zr_xTi_{1-x})O_3$; a complex perovskite relaxer type ferroelectric material represented by $Pb(Mg_{1/3}Nb_{2/3})O_3$, etc., a bismuth layered compound represented by $Bi_4Ti_3O_{12}$, $SrBi_2Ta_2O_9$, etc.; or a tungsten bronze type ferroelectric material represented by $(Sr_{1-x}Ba_x)Nb_2O_6$, $PbNb_2O_6$, etc. Meanwhile, a ratio of A site and B site of the perovskite structure, the perovskite relaxer type ferroelectric material, the bismuth layered compound, and the tungsten bronze type ferroelectric material is typically an integral ratio; however, it is allowable to intentionally depart the ratio from the integral ratio to improve the characteristics. Furthermore, an additive can be appropriately added to the dielectric layers 2, 4, 6, 8, and 10 as an accessory component to control the characteristics of the dielectric layers 2, 4, 6, 8, and 10.

A thickness of each of the dielectric layers 2, 4, 6, 8, and 10 is, for example, about 10 nanometers (nm) to 1000 nm. Moreover, a surface area of each of the dielectric layers 2, 4, 6, 8, and 10 is, for example, about 0.9×0.5 mm².

The above-explained internal electrodes 3, 5, 7, and 9 that are sandwiched between the dielectric layers 2, 4, 6, 8, and 10 are made of electrically conducting material containing nickel (Ni) as a principal component. To the internal electrodes 3, 5, 7, and 9 can be added at least one element (hereinafter, "additive element") selected from a group consisting of platinum (Pt), palladium (Pd), iridium (Ir), rhodium (Rh), ruthenium (Ru), osmium (Os), rhenium (Re), tungsten (W), chromium (Cr), tantalum (Ta), and silver (Ag). Addition of the additive element to the internal electrodes 3, 5, 7, and 9 allows adjustment of a size and/or the number of through holes in the internal electrodes 3, 5, 7, and 9. Meanwhile, plural additive elements can be added in the internal electrodes 3, 5, 7, and 9.

It is preferable that the upper electrode 11 is made from an alloy that contains Ni as a principal component. The upper electrode 11 may contain a minute amount of impurities. As the impurities contained in the upper electrode 11 that is made from the alloy containing Ni as the principal component, transition metal elements such as iron (Fe), titanium (Ti), copper (Cu), aluminium (Al), magnesium (Mg), manganese (Mn), silica (Si) or chromium (Cr), vanadium (V), zinc (Zn), niobium (Nb), tantalum (Ta), yttrium (Y), lanthanum (La), and cesium (Ce), or rare-earth elements, or chlorine (Cl), sulfur (S), phosphorus (P), etc., can be considered. Meanwhile, the upper electrode 11 can be made from, apart from the alloy containing Ni as the principal component, Al, Cu, W, Cr, Ta, Nb, etc. that are used to make wirings in Si semiconductors or display panels, or Pt, Pd, Ir, Rh, Ru, Os, Re, Ti, Mn, Ag, etc.

A thickness of each of the internal electrodes 3, 5, 7, and 9 and the upper electrode 11 is, for example, about 10 nm to 3000 nm. Moreover, a surface area of each of the internal electrodes 3, 5, 7, and 9 and the upper electrode 11 is, for example, about 0.9×0.4 mm².

Although the dielectric layer 2 is discontinuous in a cross-section of the thin-film capacitor 100 shown in FIG. 1, the dielectric layer 2 is continuous in a plane that is orthogonal to the lamination direction. Similarly, each of the dielectric layers 4, 6, 8, and 10, the internal electrodes 3, 5, 7, and 9, and the upper electrode 11 are continuous in the plane that is orthogonal to the lamination direction.

The terminal electrodes 14 and 15 are made from an electrically conducting material such as Cu.

It is preferable that the cover layer 12 be made from a material that is the same as that of the dielectric layers 2, 4, 6, 8, and 10. In other words, the cover layer 12 is preferably made from the (ferro) dielectric material having the perovskite structure such as $BaTiO_3$ (barium titanate), $(Ba_{1-x}Sr_x)TiO_3$ (barium strontium titanate), $(Ba_{1-x}Ca_x)TiO_3$, $PbTiO_3$, and $Pb(Zr_xTi_{1-x})O_3$; the complex perovskite relaxer type ferroelectric material represented by $Pb(Mg_{1/3}Nb_{2/3})O_3$, etc.; the bismuth layered compound represented by $Bi_4Ti_3O_{12}$, $SrBi_2Ta_2O_9$, etc.; or the tungsten bronze type ferroelectric material represented by $(Sr_{1-x}Ba_x)Nb_2O_6$, $PbNb_2O_6$, etc. By making the cover layer 12 from the material that is the same as that of the dielectric layers 2, 4, 6, 8, and 10, because generation of a stress between the cover layer 12 and the other layers (specifically, dielectric layer 10, etc.) that are in contact with the cover layer 12 can be suppressed, it is possible to increase an electrostatic capacitance and suppress a leak current. Meanwhile, the material of the cover layer 12 is not limited to the above-mentioned materials, and the cover layer 12 can be made from an insulating material such as SiO$_2$, alumina, and SiN (silicon nitride). In this manner, in the thin-film capacitor 100 according to the present embodiment, the cover layer 12, which is made from the material that is the same as that of the dielectric layers 2, 4, 6, 8, and 10, is provided so as to cover an upper side of the upper electrode 11. That is, even the upper electrode 11, in the same manner as the internal electrodes 3, 5, 7, and 9, is sandwiched between two dielectric layers.

When the upper electrode 11 is made from an electrically conducting material containing nickel (Ni) as the principal component, to the upper electrode 11 can be added at least one element selected from a group consisting of platinum (Pt), palladium (Pd), iridium (Ir), rhodium (Rh), ruthenium (Ru), osmium (Os), rhenium (Re), tungsten (W), chromium (Cr), tantalum (Ta), and silver (Ag). Addition of the additive element to the upper electrode 11 allows adjustment of a size and the number of through holes in the upper electrode 11. Meanwhile, plural additive elements can be added in the upper electrode 11. In this manner, in the present embodiment, because the cover layer 12 is made from the material that is the same as that of the dielectric layers 2, 4, 6, 8, and 10, the cover layer 12 does not contribute to the capacitance since it is a dielectric, the cover layer 12 is structurally similar to a dielectric layer so that the cover layer 12 can be treated here as a dielectric layer. That is, the upper electrode 11 in the thin-film capacitor 100 according to the present embodiment is laminated between dielectric layers and functions as an electrode that contains Ni as the principal component.

The insulating protective layer 13 that is provided between the terminal electrodes 14 and 15 and the cover layer 12 is made from polyimide, etc. A leak current between the cover layer 12 and the terminal electrodes 14 and 15 can be suppressed by covering the cover layer 12 with the insulating protective layer 13. Although it is preferable to provide the insulating protective layer 13 between the terminal electrodes 14 and 15 and the cover layer 12 from the view point of the leak current, the insulating protective layer 13 can be omitted.

Figure 2:
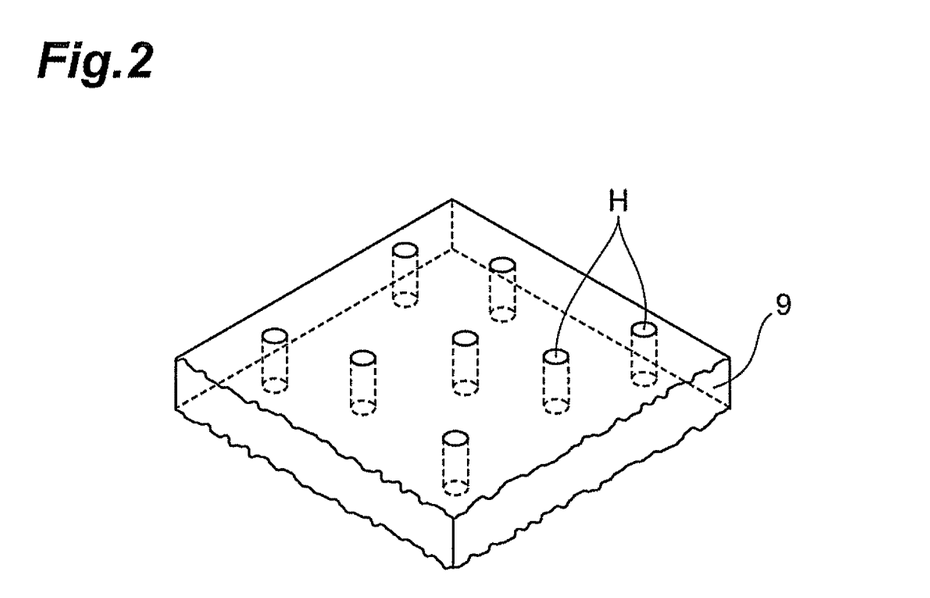
FIG. 2 is a perspective view of the thin-film capacitor for explaining about internal electrodes.

As shown in FIG. 2, each of the internal electrodes 3, 5, 7, and 9 and the upper electrode 11 in the thin-film capacitor 100 according to the present embodiment have many through holes H in the lamination direction. Meanwhile, FIG. 2 schematically depicts a par of the internal electrode 9 out of the internal electrodes 3, 5, 7, and 9 and the upper electrode 11. A surface area of at least some of the through holes H is in the range of 0.19 μm$^2$ to 7.0 μm$^2$; however, it is preferable that the surface area of all the through holes H is in this range. Furthermore, for each of the internal electrodes 3, 5, 7, and 9 and the upper electrode 11, a ratio of the surface area of the through holes H in these electrodes to a surface area of an entire main surface of these electrodes is in the range of 0.05% to 5%. Assuming the through hole H to be circular in a cross-section with a diameter in the range of 0.5 μm to 3.0 μm, the surface area of the through hole H will be in the range of 0.19 μm$^2$ to 7.0 μm$^2$.

Presence of the through holes H in the internal electrodes 3, 5, 7, and 9 and the upper electrode 11 leads to a relaxation of a stress between the electrode and the dielectric layers (the cover layer is also a dielectric layer in the thin-film capacitor 100 according to the present embodiment) present above and below the electrode. Consequently, peeling and/or cracking at the boundaries of these electrodes is suppressed from occurring leading to an increase in the yield at the time of manufacturing. The through holes H are internally hollow, that is, it is preferable that the through holes H be not closed by the upper and lower dielectric layers. Because the through holes H are internally hollow, the yield is further increased as a result of an increased suppression effect of peeling or cracking. These advantages can be obtained even if not all the internal electrodes in a multi-layered electrode structure have the through holes H; however, occurrence of peeling or cracking can be suppressed more when all the internal electrodes are provided with the through holes H.

Figure 3:
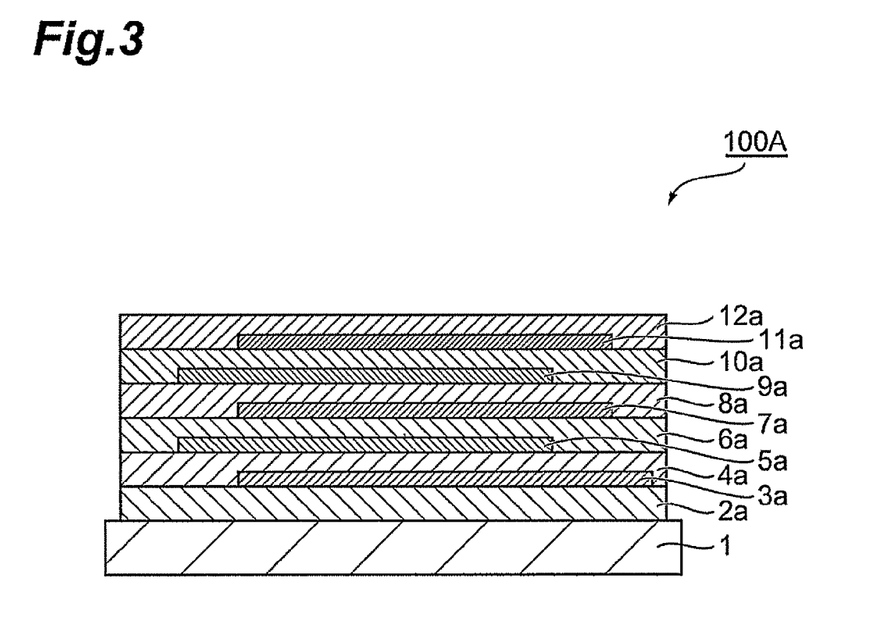
FIG. 3 is a schematic cross-section of the thin-film capacitor for explaining a manufacturing method of the thin-film capacitor shown in FIG. 1.
Figure 4:
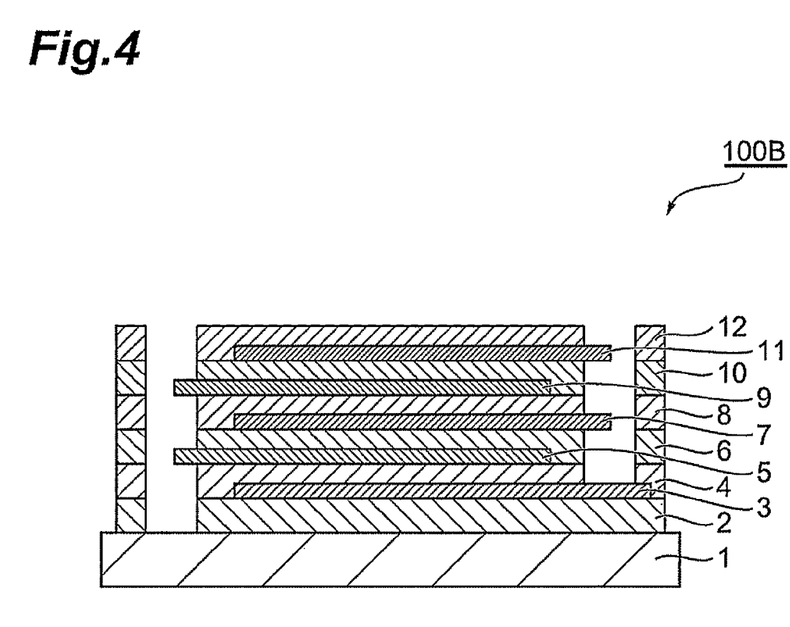
FIG. 4 is a schematic cross-section of the thin-film capacitor for explaining the manufacturing method of the thin-film capacitor shown in FIG. 1.

The manufacturing method of the thin-film capacitor 100 according to present embodiment will be explained next while referring to FIGS. 3 and 4. FIGS. 3 and 4 are schematic cross-sections of the thin-film capacitor 100 for explaining the manufacturing method of the thin-film capacitor shown in FIG. 1. The manufacturing method of the thin-film capacitor 100 according to the present embodiment includes a process of forming the laminated member by alternately laminating dielectric films and internal electrode layers on a base electrode and then laminating a cover layer on the top, the firing, and a terminal electrode formation and connection process.

First, the process of forming the laminated member will be explained. The base electrode 1 that is made from the metal foil is prepared. If needed, a surface of the metal foil is polished. The surface can be polished by methods such as a CMP (Chemical Mechanical Polishing), an electrolytic polishing, or a buffing machining. Subsequently, a dielectric film 2a is formed on the base electrode 1. A composition of the dielectric film 2a can be set to the same composition as that of the dielectric layer 2 of the completed thin-film capacitor 100. The dielectric film 2a can also be formed by using film formation techniques such as a sputtering method or a vapor-deposition technique represented by a CVD (Chemical Vapor Deposition) method and a CSD (Chemical Solution Deposition) method apart from a PVD (Physical Vapor Deposition) method; however, the sputtering method is more preferable among these methods.

Subsequently, an internal electrode layer 3a containing Ni as the principal component is formed on the surface of the dielectric film 2a. A composition of the internal electrode layer 3a can be set to the same composition as that of the internal electrode layer 3a of the completed thin-film capacitor 100. The internal electrode layer 3a shown in FIG. 3 is formed by performing pattern formation while using a mask. Meanwhile, the sputtering method is preferable as a method of formation of the internal electrode layer 3a, and it is specifically preferable that the sputtering method be conducted in an environment where a gas pressure is 0.8 pascal (Pa) or lower.

Subsequently, a dielectric film 4a is formed on the internal electrode layer 3a. Then, an internal electrode layer 5a, a dielectric film 6a, an internal electrode layer 7a, a dielectric film 8a, an internal electrode layer 9a, and a dielectric film 10a are sequentially formed on the dielectric film 4a. Compositions and methods of formation of these internal electrode layers and dielectric films are the same as those of the dielectric film 2a and the internal electrode layer 3a.

Subsequently, an upper electrode layer 11a made from Ni is formed on the surface of the dielectric film 10a. Even here, the upper electrode layer 11a shown in FIG. 3 is formed by performing pattern formation while using a mask. A DC sputtering method can be considered as a method for forming the upper electrode layer 11a. Subsequently, a cover film 12a is formed so as to cover the surface of the dielectric film 10a and the upper electrode layer 11a. As a result, a laminated member 100A consisting of the dielectric film 2a, the internal electrode layer 3a, the dielectric film 4a, the internal electrode layer 5a, the dielectric film 6a, the internal electrode layer 7a, the dielectric film 8a, the internal electrode layer 9a, the dielectric film 10a, the upper electrode layer 11a, and the cover film 12a in this order on the base electrode 1 is obtained.

It is preferable that the cover film 12a be made from a material having the same composition as that of the dielectric films 2a, 4a, 6a, 8a, and 10a, and that the cover film 12a be formed by using the same method as that used for forming these dielectric films.

Then, the laminated member 100A is subjected to the firing. The firing is performed at a temperature between 700° C. and 900° C. By performing the firing at a temperature that is in this range, the dielectric films 2a, 4a, 6a, 8a, and 10a are sintered (crystallized), and, the through holes, at least some of which have a surface area in the range of 0.19 $\mu m^2$ to 7.0 $\mu m^2$ and of which a ratio of a surface area to a surface area of a main surface of the electrodes is in the range of 0.05% to 5%, are formed in the internal electrode layers 3a, 5a, 7a, and 9a. If the temperature at the time of the firing is equal to or less than 700° C., through holes having a surface area smaller than the lower limit of the above-mentioned range are only formed, and if the temperature is equal to or less than 900° C., through holes having a surface area larger than the upper limit of the above-mentioned range are only formed. The firing can be performed for about 5 minutes to 2 hours. An atmosphere at the time of the firing is not limited and it can be any one of an oxidizing atmosphere, a reducing atmosphere, and a neutral atmosphere; however, an oxygen partial pressure is set in a range of $1.0 \times 10^{-17}$ atmospheres (atm) to $1.0 \times 10^{-14}$ atm. If the oxygen partial pressure is higher than $1.0 \times 10^{-14}$ atm, the ratio of the surface area of the through holes H to the surface area of the main surface of the internal electrode becomes lower than 0.05%, and if the oxygen partial pressure is lower than $1.0 \times 10^{-17}$ atm, the ratio of the surface area of the through holes H to the surface area of the main surface of the internal electrode becomes higher than 5%. The dielectric layers 2, 4, 6, 8, and 10, the internal electrodes 3, 5, 7, and 9, the upper electrode 11, and the cover layer 12 are formed by performing the firing under these conditions.

Subsequently, the terminal electrode formation and connection process is performed with respect to the fired laminated member. Concretely, as shown in a laminated member 100B in FIG. 4, portions of the cover layer 12 and the dielectric layers 2, 4, 6, 8, and 10 located below the cover layer 12 are removed. The removal of the cover layer 12 and the dielectric layers 2, 4, 6, 8, and 10 is performed by methods such as a wet etching and a dry etching. Then, after forming the insulating protective layer 13 of polyimide, etc. so as to cover portions that are exposed to the outside of the dielectric layers 2, 4, 6, 8, and 10 and the cover layer 12 of the laminated member 100B, the terminal electrodes 14 and 15 are formed. The terminal electrode 14 is electrically connected to the base electrode 1 and the internal electrodes 5 and 9 through a via hole, and the other terminal electrode 15 is electrically connected to the internal electrodes 3 and 7 and the upper electrode 11 through a via hole. Subsequently, the laminated member with the terminal electrodes 14 and 15 attached thereto is subjected to annealing. The annealing is performed in a reduced-pressure atmosphere and in an environment where a temperature is in a range of 200° C. to 400° C. The reduced-pressure atmosphere indicates an environment where a pressure is below 1 atm (=101325 Pa). Electrical characteristics can be stabilized by performing the annealing. As a result, the thin-film capacitor 100 according to the present embodiment shown in FIG. 1 is obtained.

As explained above, in the thin-film capacitor 100 according to the present embodiment, because the through holes H are formed in the internal electrodes 3, 5, 7, and 9 containing Ni as the principal component in the lamination direction, the surface area of at least some of the through holes H is in the range of 0.19 $\mu m^2$ to 7.0 $\mu m^2$, and the ratio of the surface area of the through holes H to the surface area of the entire main surface of the internal electrodes 3, 5, 7, and 9 is in the range of 0.05% to 5%, peeling or cracking is suppressed from occurring at the boundaries between the internal electrodes 3, 5, 7, and 9 and the dielectric layers 2, 4, 6, 8, and 10, and as a result, the yield is enhanced. Furthermore, in the thin-film capacitor 100, because the upper electrode 11 is also made from Ni, and, the upper portion of the upper electrode 11 is covered by the cover layer 12 that is made from the same material as that of the dielectric layer, and, the through holes H are formed even in the upper electrode 11, in the same manner as the internal electrodes 3, 5, 7, and 9, peeling or cracking is suppressed from occurring at the boundary between the dielectric layer 10 and the cover layer 12.

If all the through holes H are made to have the surface area in the range of 0.19 $\mu m^2$ to 7.0 $\mu m^2$, internal peeling or cracking in the thin-film capacitor 100 is further suppressed.

Moreover, as the through holes H formed in the internal electrodes 3, 5, 7, and 9 of the thin-film capacitor 100 are internally hollow, peeling or cracking is further suppressed from occurring, and the yield is further enhanced.

The embodiments of the present invention are explained above; however, the present invention is by no means limited to these embodiments, and the present invention can be modified in various ways.

For example, a situation where the firing of the dielectric layers 2, 4, 6, 8, and 10 and the cover layer 12, which are laminated on the base electrode 1, is performed collectively at one time has been explained in the above embodiments; however, the firing can be performed many times (every time a dielectric layer is formed). In this case, the through holes H are formed in the internal electrodes 3, 5, 7, and 9 and the upper electrode 11 by adjusting firing conditions in a state that the internal electrodes 3, 5, 7, and 9 and the upper electrode 11 are, respectively, sandwiched between the upper and lower dielectric layers.

Furthermore, a method in which pattern formation is performed by the wet etching method, etc., after formation and firing of the dielectric films 2a, 4a, 6a, 8a, and 10a is explained in the above embodiments; however, a method in which the pattern formation and the formation of the dielectric films is performed simultaneously can be employed.

Moreover, a configuration in which four internal electrodes 3, 5, 7, and 9 are provided on the base electrode 1 is explained in the above embodiments; however, the number of the internal electrodes is not particularly limited. When the number of the internal electrodes is changed, electrical connections between the internal electrodes and the terminal electrodes 14 and 15 can be changed appropriately.

Furthermore, the cover layer 12 and the insulating protective layer 13 provided in the thin-film capacitor 100 of the above embodiment can be omitted.

Moreover, only in the case as in the present embodiment where the upper portion of the upper electrode is covered by the cover layer that is made from the dielectric material, the present invention can be applied to a one-layer thin-film capacitor consisting of only a base electrode and an upper electrode. The upper electrode that is covered by the cover layer is sandwiched between two dielectric layers. Consequently, when the firing is performed under the conditions mentioned in the above embodiment, because the through holes are formed in the upper electrode, the advantage of the invention of suppressing peeling and cracking can be obtained.

The present invention is explained more concretely below by way of examples and comparative examples; however, the present invention is by no means limited to these examples.

EXAMPLE 1

In Example 1, the thin-film capacitor 100 shown in FIG. 1 is manufactured with the following method. First, the base electrode 1 shown in FIG. 3 is prepared by mirror-like polishing a surface of a 50 μm thick nickel foil. Subsequently, a BaTiO3 film is formed as the dielectric film 2a on the polished surface of the Ni foil by sputtering with BaTiO3 as a target. During the sputtering for forming the dielectric film 2a, a temperature of the Ni foil is maintained at 250° C. A 300 nm thick $BaTiO_3$ film is formed.

Subsequently, an Ni layer is pattern-formed as the internal electrode layer 3a on a surface of the $BaTiO_3$ film by sputtering with Ni as the principal component as a target. A 200 nm thick internal electrode layer 3a is formed. Then, a laminated member consisting of the base electrode 1, the dielectric film 2a, the internal electrode layer 3a, the dielectric film 4a, the internal electrode layer 5a, the dielectric film 6a, the internal electrode layer 7a, the dielectric film 8a, the internal electrode layer 9a, the dielectric film 10a, and the upper electrode layer 11a is formed by repeatedly performing the processes similar to the processes of formation of the dielectric film 2a and the internal electrode layer 3a. Subsequently, a $BaTiO_3$ film is further formed as the cover layer 12 by sputtering with $BaTiO_3$ as a target. As a result, the laminated member 100A shown in FIG. 3 is obtained.

Next, the laminated member 100A is subjected to the firing for 1 hour at a temperature of 800° C. in an environment in which the oxygen partial pressure is adjusted to $5.8 \times 10^{-15}$ atm to crystallize the dielectric films 2a, 4a, 6a, 8a, and 10a made of BaTiO3 film and the cover film 12a.

Figure 5:
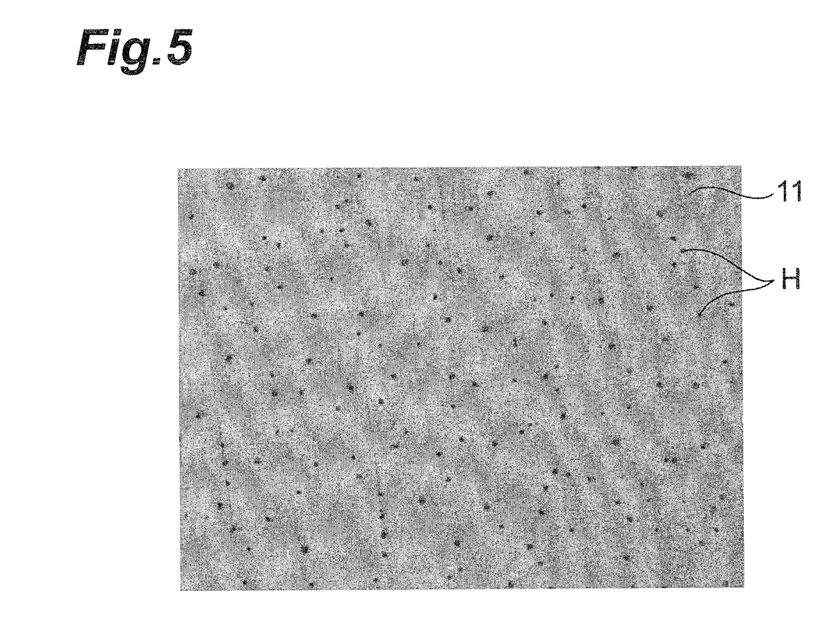
FIG. 5 depicts an optical microscope image of a dielectric layer taken from an upper surface of the dielectric layer.
Figure 6:
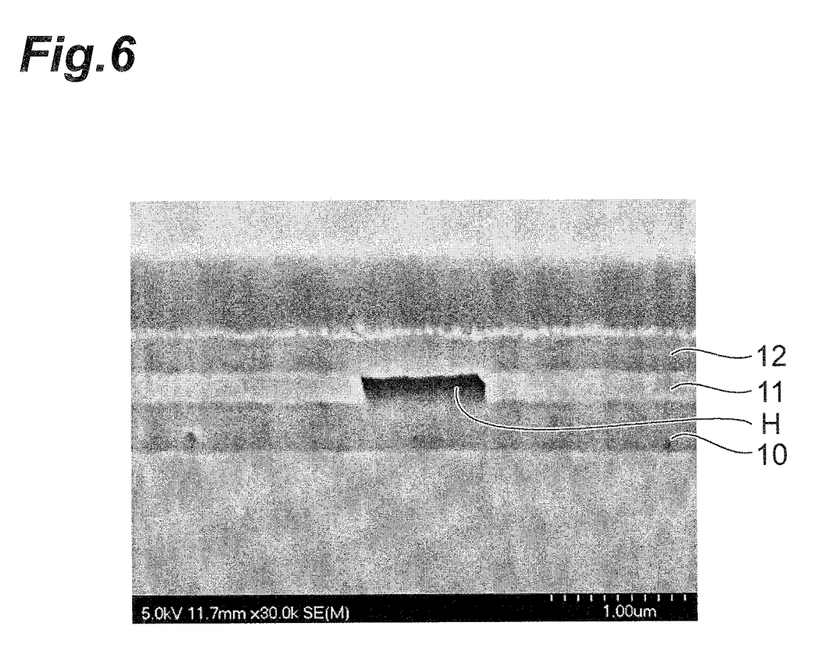
FIG. 6 is a scanning electron microscope (SEM) image of a cross-section of the dielectric layer.

An upper surface of the fired laminated member (i.e., from the fired cover layer 12 side) is observed under an optical microscope with an object to confirm a state of the electrodes after the firing. Because the cover layer 12 is transparent, holes inside the topmost upper electrode 11 can be observed through the optical microscope. An optical microscope image shown in FIG. 5 is obtained, and presence of the through holes H having the surface area 0.785 $\mu m^2$ (equivalent to a true circle of diameter of 1 m) is confirmed. Moreover, there are 100 through holes H inside a 0.01 $mm^2$ area of the main surface of the upper electrode 11, and a ratio of a surface area of an area without the through holes H in the main surface is 99.2%. That is, a ratio of the surface area of the through holes H to the surface area of the main surface is 0.8%. A portion of the through holes H is also observed under a cross-section SEM (Scanning Electron Microscope). The result of this observation is shown in FIG. 6 (meanwhile, an image shown in FIG. 6 is an SEM image in a configuration in a least-laminated structure among the thin-film capacitors according to the present invention, that is, the image represents an Ni electrode sandwiched between two dielectric layers). As shown in FIG. 6, the through hole H communicates from a lower surface to an upper surface of the upper electrode 11 having a film thickness of 200 nm, and there is no dielectric material inside the through hole H, that is, the through hole is internally hollow. The internally hollow structure seen in FIG. 6 is also observed in a multi-layered thin-film capacitor having many laminated layers.

Then, the laminated member 100B shown in FIG. 4 is manufactured as follows. That is, the cover layer 12, which is made of BaTiO3, and the dielectric layers 2, 4, 6, 8, and 10 of the fired laminated member are subjected to the wet etching to form, on the upper surface of the cover layer 12, an opening for connecting the internal electrodes 5 and 9 and the base electrode 1, and an opening that communicates with the internal electrodes 3 and 7 and the upper electrode 11. OFPR-800 that is a product of Tokyo Ohka Kogyo Co., Ltd. is used as a photoresist, and a mixture of hydrochloric acid and aqueous ammonium fluoride solution is used as an etching solution in the wet etching. Subsequently, the insulating protective layer 13 made from polyimide is provided so as to cover the surfaces of the base electrode 1, the dielectric layer 2, the internal electrode 3, the dielectric layer 4, the internal electrode 5, the dielectric layer 6, the internal electrode 7, the dielectric layer 8, the internal electrode 9, the dielectric layer 10, the upper electrode 11, and the cover layer 12, and then, the terminal electrodes 14 and 15 made from Cu are formed by sputtering to obtain a thin-film capacitor of a 1005 size. The terminal electrode 14 is electrically connected to the internal electrodes 5 and 9 and the base electrode 1 via the opening in the cover layer 12, and the terminal electrode 15 is electrically connected to the internal electrodes 3 and 7 and the upper electrode 11 via a hole in the cover layer 12. The thin-film capacitor is subjected to annealing at 310° C. in a vacuum atmosphere to achieve stability, and the thin-film capacitor 100 according to Example 1 is obtained.

EXAMPLES 2 To 11

The thin-film capacitors 100 according to each of Examples 2 to 11 is manufactured with the same method as that in Example 1 while changing at least one condition among the conditions at the time of the firing of the laminated member 100A (firing temperature and oxygen partial pressure), the compositions of the internal electrodes 3, 5, 7, and 9 and the upper electrode 11, the gas pressure at the time of formation of the internal electrodes 3, 5, 7, and 9 and the upper electrode 11, and the film thicknesses of the internal electrodes 3, 5, 7, and 9 and the upper electrode 11.

In the same manner as in Example 1, the fired laminated member (which is obtained by subjecting the laminated member 100A shown in FIG. 3 to the firing) is observed under the optical microscope from above, and the surface area of the through hole, a diameter of a true circle that is equivalent to the surface area of the through hole, the number of the through holes per 0.01 $mm^2$ area of the main surface, and the ratio of the surface area of the through holes to the surface area of the main surface are measured or calculated as appropriate.

COMPARATIVE EXAMPLES 1 To 9

The thin-film capacitors 100 according to each of Comparative Examples 1 to 9 is manufactured with the same method as that in Example 1 while changing at least one condition among the conditions at the time of the firing of the laminated member 100A (the firing temperature and the oxygen partial pressure), the compositions of the internal electrodes 3, 5, 7, and 9 and the upper electrode 11, the gas pressure at the time of formation of the internal electrodes 3, 5, 7, and 9 and the upper electrode 11, and the film thicknesses of the internal electrodes 3, 5, 7, and 9 and the upper electrode 11. Meanwhile, in Comparative Example 5, the internal electrodes 3, 5, 7, and 9 and the upper electrode 11 are formed by using the vapor-deposition technique instead of the sputtering.

In the same manner as in Example 1, the fired laminated member (which is obtained by subjecting the laminated member 100A shown in FIG. 3 to firing) is observed under the optical microscope from above, and the surface area of the through hole, the diameter of a true circle that is equivalent to the surface area of the through hole, the number of the through holes per 0.01 mm² area of the main surface, and the ratio of the surface area of the through holes to the surface area of the main surface are measured or calculated as appropriate.

Because a lot of cracks developed in the fired laminated member according to Comparative Examples 1, 3, and 4, some steps in manufacturing the thin-film capacitor 100 (formation of the openings, the connection of terminal electrodes, and the annealing) could not be performed. Similarly, because a lot of peeling took place in the fired laminated member according to Comparative Examples 2 and 5, some steps in manufacturing the thin-film capacitor 100 (formation of the openings, the connection of terminal electrodes, and the annealing) could not be performed.

Manufacturing conditions employed in Examples 1 to 11 and Comparative Examples 1 to 9 are listed in Table 1.

Evaluation

The yield of the thin-film capacitor according to each of Examples 1 to 11 and Comparative Examples 1 to 9, and the surface area of the through hole, the diameter of a true circle that is equivalent to the surface area of the through hole, the number of the through holes per 0.01 mm² area of the main surface, and the ratio of the surface area of the through holes to the surface area of the main surface of the upper electrode that in the topmost electrode in the fired laminated member are listed in Table 2. Meanwhile, it is observed that the through holes in Example 10 were not internally hollow, and the upper and lower dielectric layers entered in the through holes. In Example 11, because through holes with a larger surface area and through holes with a smaller surface area coexisted, the surface areas of the through holes with the larger surface area and the through holes with the smaller surface area are shown separately, and a total of the ratios of the surface areas of these two types of through holes to the surface area of the main surface is shown as one value. Furthermore, as explained above, because the thin-film capacitor is difficult to manufacture from the fired laminated member in Comparative Examples 1 to 5, a percent defective for these Comparative Examples 1 to 5 is set to 0%. Moreover, because the through holes were not formed at all in the fired laminated member in Comparative Examples 1 and 4, the result regarding the through hole is set to 0 (zero). Furthermore, because peeling and/or cracking occurred in the thin-film capacitor according to each of Comparative Examples 1 to 9, which one out of the peeling and cracking occurred is also shown in Table 2.

TABLE 1

| | Manufacturing conditions | | | | |
|---|---|---|---|---|---|
| | Firing Temperature (° C.) | Oxygen Partial Pressure During Firing (atm) | Gas Pressure in Electrode Sputtering | Electrode Composition | Film Thickness |
| Example 1 | 825 | $5.8 \times 10^{-15}$ | 0.5 Pa | Ni | 300 nm |
| Example 2 | 800 | $5.8 \times 10^{-15}$ | 0.14 Pa | Ni | 2000 nm |
| Example 3 | 875 | $5.8 \times 10^{-15}$ | 0.5 Pa | NiPd (Pd15 mol %) | 300 nm |
| Example 4 | 825 | $3.0 \times 10^{-15}$ | 0.5 Pa | Ni | 300 nm |
| Example 5 | 825 | $5.8 \times 10^{-15}$ | 0.8 Pa | Ni | 300 nm |
| Example 6 | 825 | $1.0 \times 10^{-15}$ | 0.5 Pa | Ni | 300 nm |
| Example 7 | 825 | $3.0 \times 10^{-15}$ | 0.5 Pa | Ni | 1000 nm |
| Example 8 | 825 | $5.8 \times 10^{-15}$ | 0.14 Pa | Ni | 300 nm |
| Example 9 | 875 | $5.8 \times 10^{-15}$ | 0.5 Pa | NiIr (Ir 10 mol %) | 300 nm |
| Example 10 | 830 | $9.8 \times 10^{-15}$ | 0.5 Pa | Ni | 50 nm |
| Example 11 | 870 | $1.0 \times 10^{-17}$ | 0.5 Pa | Ni | 300 nm |
| Comparative Example 1 | 800 | $5.8 \times 10^{-13}$ | 0.5 Pa | Ni | 300 nm |
| Comparative Example 2 | 1000 | $5.8 \times 10^{-15}$ | 0.5 Pa | Ni | 300 nm |
| Comparative Example 3 | 650 | $5.8 \times 10^{-15}$ | 0.5 Pa | Ni | 300 nm |
| Comparative Example 4 | 825 | $5.8 \times 10^{-15}$ | 0.5 Pa | Pt | 300 nm |
| Comparative Example 5 | 825 | $5.8 \times 10^{-15}$ | vapor-deposition | Ni | 300 nm |
| Comparative Example 6 | 675 | $5.8 \times 10^{-15}$ | 0.5 Pa | Ni | 300 nm |
| Comparative Example 7 | 875 | $5.8 \times 10^{-15}$ | 4 Pa | Ni | 300 nm |
| Comparative Example 8 | 825 | $1.0 \times 10^{-18}$ | 0.5 Pa | Ni | 300 nm |
| Comparative Example 9 | 825 | $5.0 \times 10^{-14}$ | 0.5 Pa | Ni | 300 nm |

TABLE 2

| | Evaluation | | | | | |
|---|---|---|---|---|---|---|
| | Surface Area of Through Holes ($\mu m^2$) | Diameter of Through Holes ($\mu m$) | Number of Through Holes (per 0.01 $mm^2$) | Surface Area Ratio of Through Holes (%) | Yield (%) | Comment |
| Example 1 | 0.785 | 1 | 100 | 0.8 | 100 | — |
| Example 2 | 0.196 | 0.5 | 50 | 0.1 | 80 | — |
| Example 3 | 0.785 | 1 | 20 | 0.15 | 100 | — |
| Example 4 | 3.140 | 2 | 15 | 0.5 | 100 | — |
| Example 5 | 4.906 | 2.5 | 60 | 3 | 82 | — |
| Example 6 | 3.140 | 2 | 160 | 5 | 81 | — |
| Example 7 | 3.140 | 2 | 65 | 2 | 100 | — |
| Example 8 | 1.766 | 1.5 | 6 | 0.1 | 100 | — |
| Example 9 | 1.766 | 1.5 | 3 | 0.05 | 80 | — |
| Example 10 | 0.196 | 0.5 | 50 | 0.1 | 57 | internal dielectric layer |
| Example 11 | 12.560 | 4 | 1 | 0.1 | 60 | — |
| | 0.785 | 1 | 100 | 0.78 | | |
| | | | | Total 0.88 | | |
| Comparative Example 1 | 0.000 | 0 | 0 | 0 | 0 | cracking |
| Comparative Example 2 | 12.560 | 4 | 50 | 6.3 | 0 | peeling |
| Comparative Example 3 | 0.031 | 0.2 | 65 | 0.02 | 0 | cracking |
| Comparative Example 4 | 0.000 | 0 | 0 | 0 | 0 | cracking |
| Comparative Example 5 | 19.625 | 5 | 50 | 9.8 | 0 | peeling |
| Comparative Example 6 | 0.126 | 0.4 | 800 | 1 | 20 | cracking |
| Comparative Example 7 | 7.544 | 3.1 | 50 | 4 | 25 | peeling |
| Comparative Example 8 | 1.766 | 1.5 | 340 | 6 | 23 | peeling |
| Comparative Example 9 | 1.766 | 1.5 | 1 | 0.01 | 30 | cracking |

From the above results, it is confirmed that, when the surface area of at least some of the through holes is in the range of 0.19 $\mu m^2$ to 7.0 $\mu m^2$ and the ratio of the surface area of the through holes to the surface area of the main surface of the electrodes is in the range of 0.05% to 5%, cracking and/or peeling is suppressed from occurring and high yield is obtained.

What is claimed is:

1. A thin-film capacitor comprising:
   a base electrode;
   two or more dielectric layers laminated on the base electrode; and
   an electrode containing Ni as a principal component and laminated between the dielectric layers, wherein
   the electrode has through holes that run in a lamination direction,
   a surface area of at least some of the through holes is in a range of 0.19 $\mu m^2$ to 7.0 $\mu m^2$,
   a ratio of the surface area of the through holes to a surface area of an entire main surface of the electrode in which the through holes are formed is in a range of 0.05% to 5%, and
   the through holes are internally hollow and both ends of the through holes are covered with the dielectric layers.

2. The thin-film capacitor according to claim 1, wherein the surface areas of all the through holes are in the range of 0.19 $\mu m^2$ to 7.0 $\mu m^2$.

* * * * *